United States Patent [19]
Yokonuma et al.

[11] Patent Number: 5,111,233
[45] Date of Patent: May 5, 1992

[54] ELECTRONIC FLASHING DEVICE

[75] Inventors: Norikazu Yokonuma, Tokyo; Nobuyoshi Hagiuda; Hideki Matsui, both of Yokohama; Hiroshi Sakamoto, Kawasaki, all of Japan

[73] Assignee: Nikon Corporation, Tokyo, Japan

[21] Appl. No.: 720,624

[22] Filed: Jun. 25, 1991

[30] Foreign Application Priority Data

Jun. 28, 1990 [JP] Japan .................... 2-173997

[51] Int. Cl.⁵ .................... G03B 7/00; G03B 15/05
[52] U.S. Cl. .................... 354/416; 354/145.1; 315/241 P
[58] Field of Search ............ 354/416, 417, 418, 145.1; 315/241 P

[56] References Cited

U.S. PATENT DOCUMENTS 4,697,906 10/1987 Kobayashi et al. ............... 354/416
5,051,768 9/1991 Harrison ....................... 354/415

Primary Examiner—W. B. Perkey
Assistant Examiner—Cassandra C. Spyrou
Attorney, Agent, or Firm—Shapiro and Shapiro

[57] ABSTRACT

An electronic flashing device comprises a flashing discharge tube for emitting light by a charge stored in a main capacitor, a voltage controlled switching device driven by a voltage applied to a control terminal thereof for controlling the light emission of the flashing discharge tube, a voltage application circuit for applying a voltage higher than the charge voltage of the main capacitor across the flashing discharge tube prior to the light emission of the flashing discharge tube, and a control voltage generation circuit for generating a voltage to be applied to the control terminal of the voltage controlled switching device in accordance with the voltage generated by the voltage application circuit.

4 Claims, 2 Drawing Sheets

ELECTRONIC FLASHING DEVICE

BACKGROUND OF THE INVENTION

1. Field of the Invention

The present invention relates to an electronic flashing device which uses a voltage controlled switching device such as an insulated gate bipolar transistor (IGBT) as a switching device to control light emission and extinguishment of a flashing discharge tube.

2. Related Background Art

A recently developed insulated gate bipolar transistor (hereinafter referred to as IGBT) is small in size and low in loss so that it is ideal as a light emission control switching device (hereinafter referred to as a light emission control device) of the electronic flashing device, and it has recently been used as the light emission control device of the electronic flash device. The IGBT has three terminals, a gate, a collector and an emitter and it is a voltage controlled switching device whose conduction and non-conduction between the collector and the emitter are controlled by a voltage applied between the gate and the emitter, like a FET.

In order to conduct the IGBT, a medium voltage of about 20-40 volts is applied to the gate (control terminal) assuming that the emitter is at a ground potential, and in order to non-conduct the IGBT, the gate and the emitter are kept at the same potential. Accordingly, a power supply voltage (3-12 volts in a conventional stroboscope) is too high as a drive voltage applied to the control terminal in order to turn on or off the IGBT, and a voltage of a main capacitor (usually 200-500 volts) which stores a discharging charge of the flashing discharge tube) is too high. Accordingly, it is necessary to separately provide a power supply to control the IGBT, and there is a problem in the cost and the space.

U.S. Pat. No. 4,697,906 discloses an electronic flashing device which uses a large size bipolar transistor to control a current flowing through the flashing discharge tube and a voltage doubler circuit for applying a voltage which is approximately double of a voltage of a main capacitor across the flashing discharge tube prior to the flashing in order to facilitate the light emission.

SUMMARY OF THE INVENTION

It is an object of the present invention to provide an electronic flashing device which devices a drive voltage of a voltage controlled light emission control switching device such as an IGBT from a voltage doubler circuit.

Referring to FIG. 1, which shows one embodiment, the present invention is applied to an electronic flashing device which comprises a flashing discharge tube Xe for emitting light by a charge stored in a main capacitor C1, a voltage controlled switching device IGBT for controlling the light emission of the flashing discharge tube Xe by turning on and off a voltage applied to a control terminal, and high voltage application means DV for applying a voltage higher than the charged voltage of the main capacitor C1 across the flashing discharge tube Xe prior to the light emission of the flashing discharge tube Xe.

The above object is achieved by the provision of control voltage generation means CV for generating a voltage to be applied to a control terminal of the voltage controlled switching device IGBT in accordance with the high voltage generated by the high voltage application means DV.

The voltage controlled switching device IGBT may be an insulated gate bipotor transistor, and the voltage generated by the control voltage generation means CV may be applied across the gate and the emitter of the insulated gate bipolar transistor.

When the voltage higher than the charged voltage of the main capacitor C1 is applied across the flashing discharge tube Xe by the high voltage application means DV such as a voltage doubler circuit, the control voltage generation means CV generates the control voltage by the voltage generated at that time, for example, a negative voltage equal to the charged voltage of the main capacitor C1. The control voltage is applied to the control terminal of the voltage controlled switching device, for example, the insulated gate bipolar transistor IGBT so that the insulated gate bipolar transistor IGBT turns on to start the light emission by the flashing discharge tube Xe. When the control voltage of the insulated gate bipolar transistor IGBT is rendered to zero volt, the transistor IGBT is rendered non-conductive and the light emission of the flashing discharge tube Xe is stopped.

While the drawing and the reference numerals of the embodiment are used to make the understanding of the present invention easier, it does not mean that the present invention is limited to the embodiment.

DETAILED DESCRIPTION OF THE PREFERRED EMBODIMENTS

One embodiment of the electronic flashing device of the present invention is explained with reference to FIGS. 1 and 2.

Figure 1:
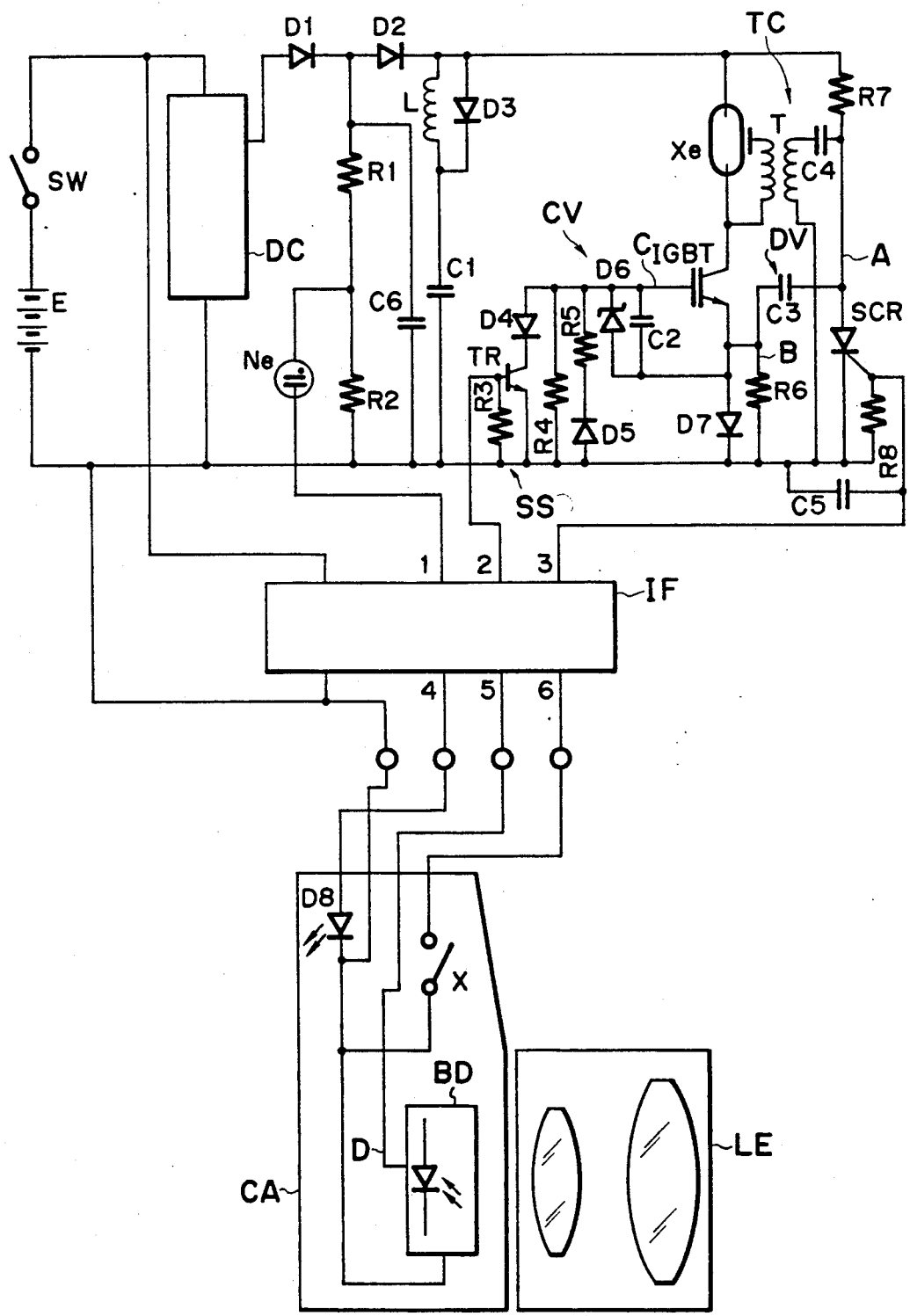
FIG. 1 shows a circuit diagram of one embodiment of the present invention.

In FIG. 1, E denotes a low power supply of the electronic flashing device which may be a battery, SW denotes a power switch, and DC denotes a DC-DC converter. When the power switch SW is closed, the DC-DC converter DC starts the voltage step-up operation and a high voltage output therefrom is applied to a main capacitor C1 through diodes D1 and D2 and an inductor L so that an energy for the flashing light emission is charged and capacitors C3, C4 and C6 are charged up. It is now assumed that a charge voltage of the main capacitor C1 is 300 volts. Ne denotes a neon lamp which is fired by a voltage divided by resistors R1 and R2 when the main capacitor C1 is charged up to 300 volts.

A flashing discharge tube Xe is connected between a power supply line and a reference voltage line. A series circuit of an insulated gate bipolar transistor as the voltage controlled switching device, and a diode D7 is connected between a cathode of the flashing discharge tube Xe and the reference voltage line.

A trigger circuit TC comprises a resistor R7, a trigger capacitor C4, a syristor SCR and a trigger transformer T. Both ends of a secondary winding of the trigger transformer T is connected between a trigger electrode and the cathode electrode of the flashing discharge tube Xe. The trigger capacitor C4 is charged to 300 volts by a loop of a positive electrode of the main capacitor C1→the resistor R7→the trigger capacitor C4→a primary winding of the trigger transformer→a negative electrode of the main capacitor C1.

A voltage doubler circuit DV comprises the capacitor C3 and a resistor R6, and a junction B thereof is connected to the emitter of the transistor IGBT. The capacitor C3 is charged to 300 volts through the resistors R7 and R6 when the capacitor C1 is charged. When the syristor SCR conducts, the emitter of the transistor IGBT is set to the negative voltage of the same level as that of the main capacitor C1, that is, −300 volts so that the voltage of 600 volts is applied across the flashing discharge tube Xe.

The control voltage generation circuit CV comprises a diode D5, a capacitor C2, a resistor R5 and a zener diode D6. When the emitter of the transistor IGBT is set to −300 volts by the voltage doubler circuit DV, a current flows through the diode D5, the resistor R5 and the capacitor C2 so that the capacitor C2 is charged. The zener diode D6 clamps the charge voltage of the capacitor C2 to 30 volts, for example. The clamp voltage is applied to the gate of the transistor IGBT.

A light emission stop circuit SS comprises a transistor TR, a resistor R3 and a diode D4. It stops the light emission when a light emission stop signal from an interface circuit IF which will be described later is supplied to the base of the transistor TR.

A camera CA having a TTL photometering ability measures a reflected light from an object by a light irradiated by the electronic flashing device, through an imaging lens LE, and when it reaches a predetermined light intensity, the light emission stop signal is supplied to an input terminal 5 of the interface circuit IF.

When a synchronization switch X is closed and an input terminal 6 of the interface circuit IF for the camera CA and the electronic flashing device changes to a low level, the interface circuit IF changes an output terminal 3 to a high level to produce a light emission start signal, and change the gate of the syristor SCR of the trigger circuit TC to a high level to conduct the syristor SCR. The capacitor C5 and the resistor R8 serve to prevent malfunction due to a noise. When the interface circuit IF receives the light emission stop signal from the photometering circuit BD, it changes the output terminal 2 to the high level to send the light emission stop signal to the electronic flashing device, injects a current to the base of the light emission stop transistor TR to conduct the transistor TR, and changes the gate of the transistor IGBT to the low level to turn off the transistor IGBT to stop the light emission. The resistor R8 serves to prevent the malfunction due to the noise. When the interface circuit IF receives a firing current for the neon lamp Ne at the input terminal 1, it supplies a ready signal from the output terminal 4 to a light emitting diode D8 of the camera.

The light emission operation is explained with reference to a timing chart of FIG. 2. It is assumed that the main capacitor C1, the trigger capacitor C4 and the voltage doubling capacitor C3 have been charged to 300 volts.

As shown in FIG. 2(a), when the synchronization switch X of the camera CA is turned on from the off position at a time t0, the output terminal 3 of the interface circuit IF assumes the high level, the syristor SCR conducts, the trigger capacitor C4 starts to rapidly discharge, a current TG shown in FIG. 2(c) flows through the trigger winding of the transformer T and the flashing discharge tube Xe is triggered. A high voltage of several K volts is generated in the secondary winding of the trigger transformer T and the discharge of the flashing discharge tube Xe is triggered through the trigger electrode. However, since the transistor IGBT is non-conductive at this moment, the flashing discharge tube Xe does not yet start the light emission, and the conduction is started as the resistance between the anode and the cathode of the flashing discharge tube Xe reduces.

As shown in FIG. 2(b), since the potential at a point A drops from 300 volts to 0 volt at this time, a potential at a point B (at the emitter of the transistor IGBT) of the capacitor C3 instantly drops to −300 volts as shown in FIG. 2(d). A potential (at a point C) of the capacitor C2 on the side of the gate of the transistor IGBT also instantly drops to −300 volts as shown in FIG. 2(e). As a result, a charge current flows into the capacitor C2 through the diode D5 and the resistor R5 so that the capacitor C2 is charged during the period t0–t1. Since the zener diode D6 is provided in parallel to the capacitor C2, the charge voltage of the capacitor C2, that is the gate-emitter voltage is clamped to the zener voltage (30 volts) as shown by a waveform C2 in FIG. 2(f). When the capacitor C2 is charged to 30 volts, the gate at the point C is at a potential L and the emitter at the point B is at a potential K, and a voltage of 30 volts is applied between the gate and the emitter of the transistor IGBT, and the transistor IGBT conducts at the time t1.

Figure 2:
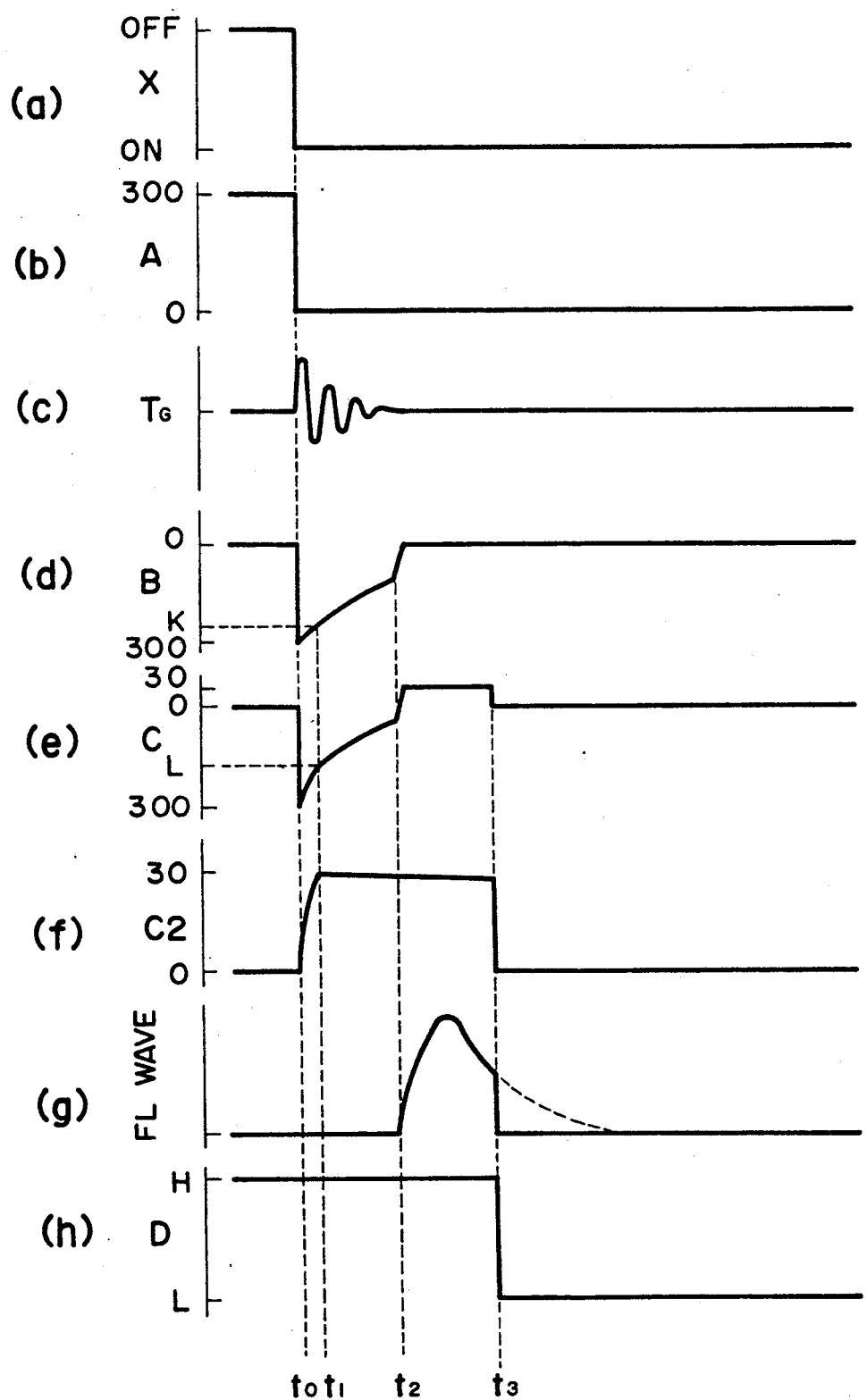
FIG. 2 shows signal waveforms in the circuit of FIG. 1.

Since the flashing discharge tube Xe has been triggered during the period t0–t1, an impedance of rare gas in the flashing discharge tube Xe rapidly decreases when the transistor IGBT conducts, and the discharging light emission starts at a time t2 in FIG. 2 (see light emission waveform in FIG. 2(g)). Then, the capacitor C3 is discharged until the time t2 through the resistor R6 and the impedance such as the resistors R4 and R5 connected to the gate of the transistor IGBT. (See waveform at the point B in FIG. 2(d).) The light emission current flows through the collector-emitter of the transistor IGBT, and it rapidly charges the capacitor C3 during a period t2–t3 so that the potential at the point B is charged to approximately 1 volt which is a forward voltage of the diode D7. However, since the capacitor C2 is provided between the gate and the emitter of the transistor IGBT, the voltage of 300 volts is applied by the charge voltage to the gate of the transistor IGBT even after the light emission. Thus, the transistor IGBT remains conducted and the light emission continues.

The object is illuminated by the light emission of the flashing discharge tube Xe. At the time t3, the film exposure reaches a proper value and the output terminal D of the photometering circuit BD changes from the high level to the low level (FIG. 2(h)). As a result, the high level light emission stop signal is produced at the output terminal 2 of the interface circuit IF. Thus, the transistor TR conducts, the capacitor C2 is discharged and the gate voltage of the transistor IGBT assumes zero volt so that the transistor IGBT is instantly rendered non-conductive and the discharge loop of the flashing discharge tube Xe is cut and the light emission is stopped.

The present invention is characterized by the generation of the control voltage of the voltage controlled switching device such as IGBT by the voltage signal generated by the voltage doubler circuit. Accordingly, the voltage doubler circuit itself and the control voltage generation circuit CV are not limited to those shown in the embodiment. Further, the switching device to start and stop the light emission is also not limited to IGBT.

In accordance with the present invention, the control voltage of the voltage controlled device such as IGBT which is used as the light emission control switching device of the flashing discharge tube is generated by using the high voltage generated by the high voltage generation circuit such as the voltage doubler circuit. Accordingly, no separate power supply for a middle voltage (several tens volts) is required and a space problem is resolved.

What is claimed is:

1. An electronic flashing device comprising:
   a flashing discharge tube for emitting light by a charge stored in a main capacitor;
   a voltage controlled switching device driven by a voltage applied to a control terminal thereof for controlling the light emission of said flashing discharge tube;
   voltage application means for applying a voltage, higher than the charge voltage of said main capacitor, across said flashing discharge tube prior to the light emission of said flashing discharge tube; and
   control voltage generation means for generating a voltage to be applied to the control terminal of said voltage controlled switching device in accordance with the voltage generated by said voltage application means.

2. An electronic flashing device according to claim 1 wherein said switching device is an insulated gate bipolar transistor, and the voltage generated by said control voltage generation means is applied between an emitter and a gate of the insulated gate bipolar transistor.

3. An electronic flashing device according to claim 1 wherein said high voltage application means includes a capacitor and a resistor.

4. An electronic flashing device according to claim 1 wherein said control voltage generation means includes a diode, a capacitor, a resistor and a zener diode.

* * * * *